[12] United States Patent
Paperin et al.

(10) Patent No.: US 8,769,229 B2
(45) Date of Patent: Jul. 1, 2014

(54) MEMORY PINNING THROUGH BUFFER ENCAPSULATION

(75) Inventors: Gregory Paperin, Redmond, WA (US); Eric L. Eilebrecht, Woodinville, WA (US); Ladislav Prosek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 13/312,822

(22) Filed: Dec. 6, 2011

(65) Prior Publication Data

US 2013/0145113 A1 Jun. 6, 2013

(51) Int. Cl.
*G06F 12/02* (2006.01)
*G06F 12/14* (2006.01)

(52) U.S. Cl.
CPC ................................. *G06F 12/0253* (2013.01)
USPC .................. 711/163; 711/165; 711/E12.005; 711/E12.093; 707/813; 710/56; 718/104

(58) Field of Classification Search
None
See application file for complete search history.

(56) References Cited

U.S. PATENT DOCUMENTS

| 6,763,440 | B1 | 7/2004 | Traversat et al. |
| 7,093,097 | B2 | 8/2006 | Herr et al. |
| 2010/0042799 | A1 | 2/2010 | Printezis |

OTHER PUBLICATIONS

"Generational GC", Retrieved on: Sep. 30, 2011, Available at: http://www.mono-project.com/Generational_GC.
Meier, et al., "Chapter 5—Improving Managed Code Performance", Retrieved on: Sep. 30, 2011, Available at: http://msdn.microsoft.com/en-us/library/ff647790.aspx#scalenetchapt05_topic14.
Ahuwanya, Sunny, "Buffer Pooling for .NET Socket Operations", Retrieved on: Sep. 30, 2011, Available at: http://www.ahuwanya.net/blog/?tag=/bufferpool.
"How to: Use the Windows ReadFile Function (C# Programming Guide)", Retrieved on: Sep. 30, 2011, Available at: http://msdn.microsoft.com/en-us/library/2d9wy99d.aspx.
"Overlapped Class.NET Framework 4." Retrieved on Oct. 3, 2011, Available at: http://msdn.microsoft.com/en-us/library/system.threading.overlapped.aspx.
"NativeOverlapped Structure.NET Framework 4." Retrieved on Oct. 3, 2011, Available at: http//msdn. microsoft.com/en-us/library/system.threading.nativeoverlapped.aspx.

*Primary Examiner* — Kevin Verbrugge
(74) *Attorney, Agent, or Firm* — Kevin Sullivan; Brian Haslam; Micky Minhas

(57) ABSTRACT

The present invention extends to methods, systems, and computer program products for memory pinning through buffer encapsulation. Within a managed execution environment, a wrapper object encapsulates a memory buffer that is to be shared with a native routine executing in a native execution environment. The wrapper object manages operation of a memory manager on a memory heap corresponding to the memory buffer. The wrapper object includes a first function which sets a pin on the memory buffer and returns a pointer identifying the memory buffer. Setting the pin causes the memory manager to cease moving the memory buffer within the memory heap. The wrapper object also includes a second function which releases the pin on the memory buffer.

20 Claims, 3 Drawing Sheets

MEMORY PINNING THROUGH BUFFER ENCAPSULATION

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Computing environments may provide both native and managed execution environments. In native execution environments, native code routines have relatively direct access to hardware and software resources. When performing memory operations, for example, native code may obtain one or more pointers to corresponding computer memory locations. Native code may then use the pointer(s) to read from and write to the content of the memory location(s).

Native code routines may include asynchronous operations, or operations that, when initiated, immediately return execution flow to the calling context and then notify the calling context about completion of a requested task some arbitrary amount of time thereafter. When a context calls an asynchronous routine, that context may require to pass the routine a pointer to a memory buffer which the routine can use to read/write data.

By contrast, in managed execution environments (e.g., virtual machines, JAVA, .NET, etc.), managed code routines have indirect access to hardware and software resources. Managed execution environments often include garbage collection functionality which manages available main computer memory (e.g., to free memory that is no longer in use, to control memory fragmentation, etc.), such as memory on a heap. In such environments a garbage collector may, from time to time, move the actual location of memory contents used by managed code routines. As such, in managed execution environments the contents of a particular memory buffer may be subject to change at any time.

In some environments, managed code routines executing within a managed execution environment may be permitted to call native code. According to at least one mechanism, a native code routine is provided access to managed memory when called (e.g., through a pointer). Managed memory provided to the native code routine is pinned for the entire life of the native code routine. Pinning managed memory causes the garbage collector to avoid moving the contents of the pinned memory. Thus, when memory is pinned for the native code routine, the garbage collector avoids moving pinned memory contents for the life of the native code routine, which may extend for relatively long durations.

Pinning managed memory can have adverse effects on operation of garbage collectors. In particular, avoiding moving pinned memory contents can hinder one or more memory optimization operations of garbage collectors. In the context of a defragmentation operation, for example, a heap may become more fragmented as memory remains pinned for longer durations. Heap fragmentation, in turn, reduces performance of managed the execution environment and any managed code routine(s) executing therein, and increases memory usage.

BRIEF SUMMARY

The present invention extends to methods, systems, and computer program products for memory pinning through buffer encapsulation. Embodiments of the present invention can efficiently pin managed memory available to a native routine during execution of the native routine so that a memory manager does not move the pinned memory. More particularly, the present invention provides a framework which reduces the amount of time that the native routine pins managed memory, such as during execution of one or more asynchronous operations by the native routine. Reducing the amount of time managed memory is pinned reduces the effect that pinning has on memory management tasks of the memory manager.

In some embodiments, a wrapper or a proxy object (here termed wrapper for brevity) is instantiated on behalf of a native routine executing in a native execution environment. The wrapper object regulates management of a memory buffer in a managed execution environment. A reference to the wrapper object is passed from the managed execution environment to the native routine.

A first call, which is generated by the native routine prior to executing an asynchronous operation, is later received at the wrapper object. In response to the first call, the memory buffer is pinned. Pinning the memory buffer prevents a memory manager from moving the memory buffer within a managed memory heap during execution of the asynchronous operation. In addition, a memory pointer is passed to the native routine through the wrapper object. The memory pointer identifies the memory buffer, which is usable by the native routine during execution of the asynchronous operation.

Subsequently, a second call, which was generated by the native routine after executing the asynchronous operation, is received at the wrapper object. In response to the second call the memory buffer is unpinned. Unpinning the memory buffer allows the memory manager to move the memory buffer within the managed memory heap.

In other embodiments, it is determined that a memory buffer in a managed execution environment is to be shared with a native routine in a native execution environment. The native routine includes an asynchronous operation. A wrapper object is instantiated around the memory buffer. The wrapper object is configured to manage operation of a memory manager on a memory heap corresponding to the memory buffer. The wrapper object includes a first function which, when called, sets a pin on the memory buffer and returns a pointer to the native routine. The pointer identifies the memory buffer. Setting the pin prevents the memory manager from moving the memory buffer within the memory heap while the native routine executes the asynchronous operation. The wrapper object also includes a second function which, when called, releases the pin on the memory buffer. A reference to the wrapper object is passed to the native routine.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
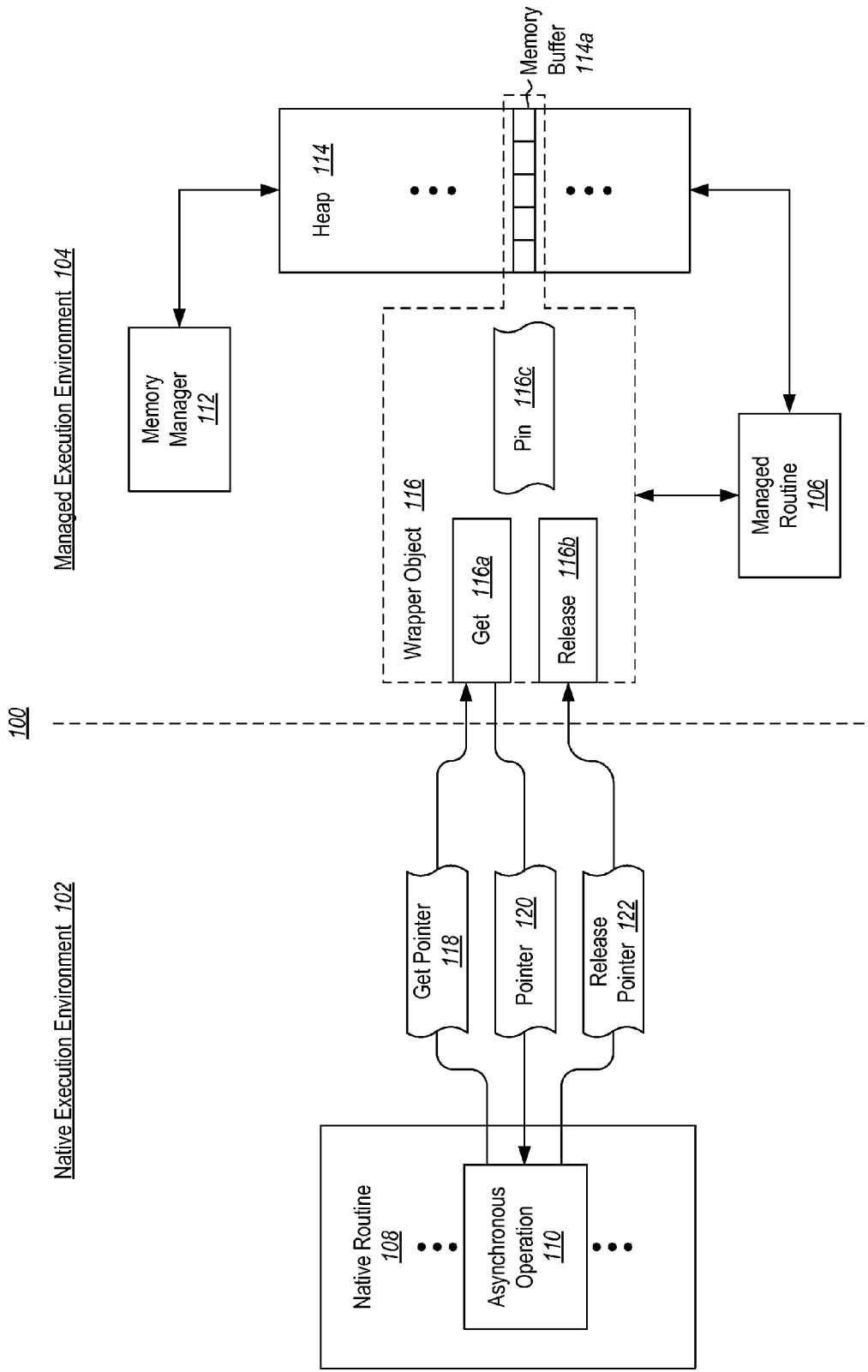
FIG. 1 illustrates an example computer architecture that facilitates managed routines making calls to asynchronous native routines while promoting efficient memory pinning.

The present invention extends to methods, systems, and computer program products for memory pinning through buffer encapsulation. Embodiments of the present invention can efficiently pin managed memory available to a native routine during execution of the native routine so that a memory manager does not move the pinned memory. More particularly, the present invention provides a framework which reduces the amount of time that the native routine pins managed memory, such as during execution of one or more asynchronous operations by the native routine. Reducing the amount of time managed memory is pinned reduces the effect that pinning has on memory management tasks of the memory manager.

In some embodiments, a wrapper or proxy object is instantiated on behalf of a native routine executing in a native execution environment. The wrapper or proxy object (here referred to as "wrapper") regulates management of a memory buffer in a managed execution environment. A reference to the wrapper object is passed from the managed execution environment to the native routine.

A first call, which is generated by the native routine prior to executing an asynchronous operation, is later received at the wrapper object. In response to the first call, the memory buffer is pinned. Pinning the memory buffer prevents a memory manager from moving the memory buffer within a managed memory heap during execution of the asynchronous operation. In addition, a memory pointer is passed to the native routine through the wrapper object. The memory pointer identifies the memory buffer, which is usable by the native routine during execution of the asynchronous operation.

Subsequently, a second call, which was generated by the native routine after executing the asynchronous operation, is received at the wrapper object. In response to the second call the memory buffer is unpinned. Unpinning the memory buffer allows the memory manager to move the memory buffer within the managed memory heap.

In other embodiments, it is determined that a memory buffer in a managed execution environment is to be shared with a native routine in a native execution environment. The native routine includes an asynchronous operation. A wrapper or proxy object is instantiated around the memory buffer. The wrapper object is configured to manage operation of a memory manager on a memory heap corresponding to the memory buffer. The wrapper object includes a first function which, when called, sets a pin on the memory buffer and returns a pointer to the native routine. The pointer identifies the memory buffer. Setting the pin prevents the memory manager from moving the memory buffer within the memory heap while the native routine executes the asynchronous operation. The wrapper object also includes a second function which, when called, releases the pin on the memory buffer. A reference to the wrapper object is passed to the native routine.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that enables managed routines to make calls to asynchronous native routines while promoting efficient memory pinning Referring to FIG. 1, computer architecture 100 includes native execution environment 102 and managed execution environment 104. Each of the depicted execution environments can exist together at a single computer system, or can be distributed across a plurality of computer systems that are connected to one another over a network, such as, for example, a Local Area Network ("LAN"), a Wide Area Network ("WAN"), and even the Internet.

As depicted, native execution environment 102 includes native routine 108. Native routine includes asynchronous operation 110. The vertical ellipses above and below asynchronous operation 110 indicate that native routine 108 can include any number of other operations. As such, native routine 108 may include a plurality of asynchronous operations and/or any number of synchronous operations. For example, native routine 108 may include synchronous operations executed prior to asynchronous operation 110 that set up a proper environment and/or context in which asynchronous operation 110 executes. Additionally or alternatively, native routine 108 may include synchronous operations executed subsequent to asynchronous operation 110 that perform clean-up or data propagation tasks. Native code may include code (e.g., operating system-level routines) that handle input and output ("I/O") functionality, such as file I/O and network I/O.

Generally, asynchronous operation 110 executes in parallel with its calling context. In other words, the calling context continues executing (i.e., does not block) after calling asynchronous operation 110. Asynchronous operation 110 performs one or more tasks (e.g., file I/O, network I/O, and the like) and then reports completion of the task(s) to its calling context. Asynchronous operation 110 is configured to utilize pointer(s) to one or more corresponding fixed memory address(es) to gain access to memory during execution. As such, the calling context typically passes one or more memory pointers to asynchronous operation 110.

Managed execution environment 104 includes heap 114, memory manager 112, and managed routine 106. Heap 114 comprises one or more memory buffers (e.g., memory buffer 114a) that are available to managed code executing within managed execution environment 104. For example, heap 114 may make memory buffer 114a available to managed routine 106 for reading, writing, etc. In general, each memory buffer exists at a particular location (i.e., memory address) within heap 114. Managed code accesses (i.e., reads from or writes to) memory contents at these locations/address. Heap 114 can contain any number of memory buffers, as depicted by the sets of vertical ellipses within heap 114. Heap 114 can contain memory buffers of varying size.

Memory manager 112 is configured to manage memory within heap 114. In doing so, memory manager 112 can automatically perform memory management and/or optimization operations on heap 114. Such operations can include, for example, compaction, defragmentation, garbage collection, and the like. Some operations, such as compaction or defragmentation of heap 114, may involve moving the location of one or more memory objects within heap 114 to make more efficient use of contiguous memory segments within heap 114 and/or to place related memory contents proximate to one another. For example, memory manager 112 may move memory contents from one location within heap 114 to another location within heap 114 to increase contiguous free space, to increase contiguous used space, or to perform any other appropriate memory optimization. As such, memory manager 112 may, from time to time, move the location of a memory buffer or object used by managed code within heap 114. Managed execution environment 104 abstracts operation of memory manager 112 and/or heap 114 from managed code. As such, managed execution environment 104 helps ensure that managed code can access allocated memory buffers, even when memory manager 112 moves the actual location of those buffers within heap 114.

Heap 114 and/or memory manager 112 are configured to perform memory pinning, when requested. Memory manager 112 avoids moving pinned memory buffers within heap 114. As such, a pinned memory buffer remains at a fixed location (e.g., fixed memory address) within heap 114, so that a pointer to that location remains valid. Pinning memory buffers enables managed code executing in managed execution environment 104 to pass pointers to pinned memory buffers to native code executing in native execution environment 102. Native code can then access (i.e., read from and/or write to) memory at these pointers.

Managed execution environment 104 is configured to provide wrapper objects. When passing pointers to managed memory to native code, managed code instantiates a wrapper object, which manages access by the native code to managed memory. As depicted, for example, when managed routine 106 calls native routine 108, managed routine 106 instantiates wrapper object 116. Then, managed routine 106 passes a reference to wrapper object 116 to native routine 108. Wrapper object 116 is configured to encapsulate memory buffer 114a for use by native routine 108. As such, wrapper object 116 is configured to place pin 116c on memory buffer 114a when appropriate, thereby preventing the location of memory buffer 114a from changing within heap 114 during operation of native routine 108.

To promote efficiency, embodiments of the invention include wrapper objects that are configured to reduce or minimize the amount of time that memory buffers are pinned by native code. For example, wrapper object 116 can be configured to enable native routine 108 to pin managed memory for less than the full life of native routine 108, such as only while native routine 108 is executing operations which use memory buffer 114a (e.g., asynchronous operation 110). More particularly, wrapper object 116 is configured with functionality which enables native code to set and release at least one memory pin.

As depicted, wrapper object 116 includes get function 116a and release function 116b, which are exposed to native routine 108. Although depicted as including two functions, wrapper object 116 may include any appropriate number of functions (i.e., one more). For example, wrapper object 116 may provide a single function which performs either get functionality or release functionality depending on a passed parameter.

Get function 116a is configured to pin a managed memory buffer and to return a pointer to the pinned memory. Thus, as depicted, native routine 108 may make get pointer request 118 to get function 116a. When wrapper object 116 receives get pointer request 118, wrapper object 116 pins memory buffer 114a, causing memory manager 112 to avoid moving the contents of memory buffer 114a. Wrapper object 116 also returns pointer 120 to native routine 108. Pointer 120 is then usable by native routine 108 for accessing memory buffer 114a. For example, native routine 108 can access memory buffer 114a through pointer 120 during execution of asynchronous operation 110. In some embodiments, pointer 120 comprises a fixed memory address of memory buffer 114a.

Get function 116a is configured to release pinned memory. For example, subsequent to issuing get pointer request 118 and obtaining pointer 120, native routine 108 may issue release pointer request 122 to release function 116b. When wrapper object 116 receives release pointer request 122, wrapper object 116 unpins memory buffer 114a, enabling memory manager 112 to again move the contents of memory buffer 114a.

Accordingly, using get function 116a and release function 116b, native routine 108 may acquire a pointer to pinned memory buffer 114a before memory buffer 114a is to be used (and preferably as late as possible). After executing operations that use memory buffer 114a, native routine 108 can cause memory buffer 114a to become released or unpinned (preferably as early as possible). As such, wrapper objects allow native routines to minimize the amount of time memory buffers are pinned. For example, the duration of pinning may be for only as long as the native routines are to use pointers (and preferably for the shortest duration possible).

Pinning and unpinning a memory buffer can comprise toggling a flag, incrementing or decrementing a counter, or any other appropriate tracking mechanism. For example, pin 116c may represent a flag or a counter within wrapper object 116 which is used by memory manager 112 to determine whether memory buffer 114a is pinned or unpinned. Of course, any appropriate pinning mechanism can be used, such as setting a counter or flag on a memory buffer itself, communicating pinning information directly to memory manager 112, updating a table, creating a pin handle, etc.

Native routines and/or asynchronous operations may pin and unpin the same memory buffer multiple times. As such, native routines and/or asynchronous operations may perform multiple get pointer requests and multiple release pointer requests. In addition, a call to get function 116a does not necessarily need to be followed by a call to release function 116b. That is, native routine 108 may call get function 116a more than one time in sequence (e.g., for different operations, such as for different asynchronous operations) without first calling release function 116b.

As such, in some embodiments wrapper object 116 is configured to track multiple requests to pin memory buffer 114a. Memory buffer 114a remains pinned as long as at least one operation is in progress (i.e., while there has been more get pointer requests than release pointer requests). As such, wrapper object 116 releases a pin on memory buffer 114a when the last operation has called release function 116b. For example, wrapper object 116 may increment a counter (e.g., pin 116c) by one for each get pointer request, and decrement the counter by one for each release pointer request. Wrapper object 116 can pin memory any time the counter is non-zero, and release the pin memory any time the counter reaches zero. In other embodiments, only one release function call may be required to un-pin the memory buffer previously pinned by one or more get functions calls on a given wrapper object. In fact, any call semantics can be used to communicate the point of time when the memory buffer must be pinned or un-pinned from the native routine to the wrapper, as long as these semantics are well-defined and clear to both, the native routine and the specific wrapper object implementations.

Furthermore, a plurality wrapper objects may manage the same memory buffer within heap 114, and a single native routine or asynchronous operation may utilize a plurality of wrapper objects.

Accordingly, computer architecture 100 facilitates and enables managed routines within managed execution environment 104 to make calls to native routines within native execution environment 102. In particular, computer architecture 100 provides wrapper objects that pin memory on heap 114 while reducing adverse effects of pinning on operation of memory manager 112. It will be appreciated that while the foregoing has been discussed in the context of native routines that execute asynchronous operations, computer architecture 100 can be used by any native code that access managed memory using pointers, whether or not the native code includes asynchronous operations.

Figure 2:
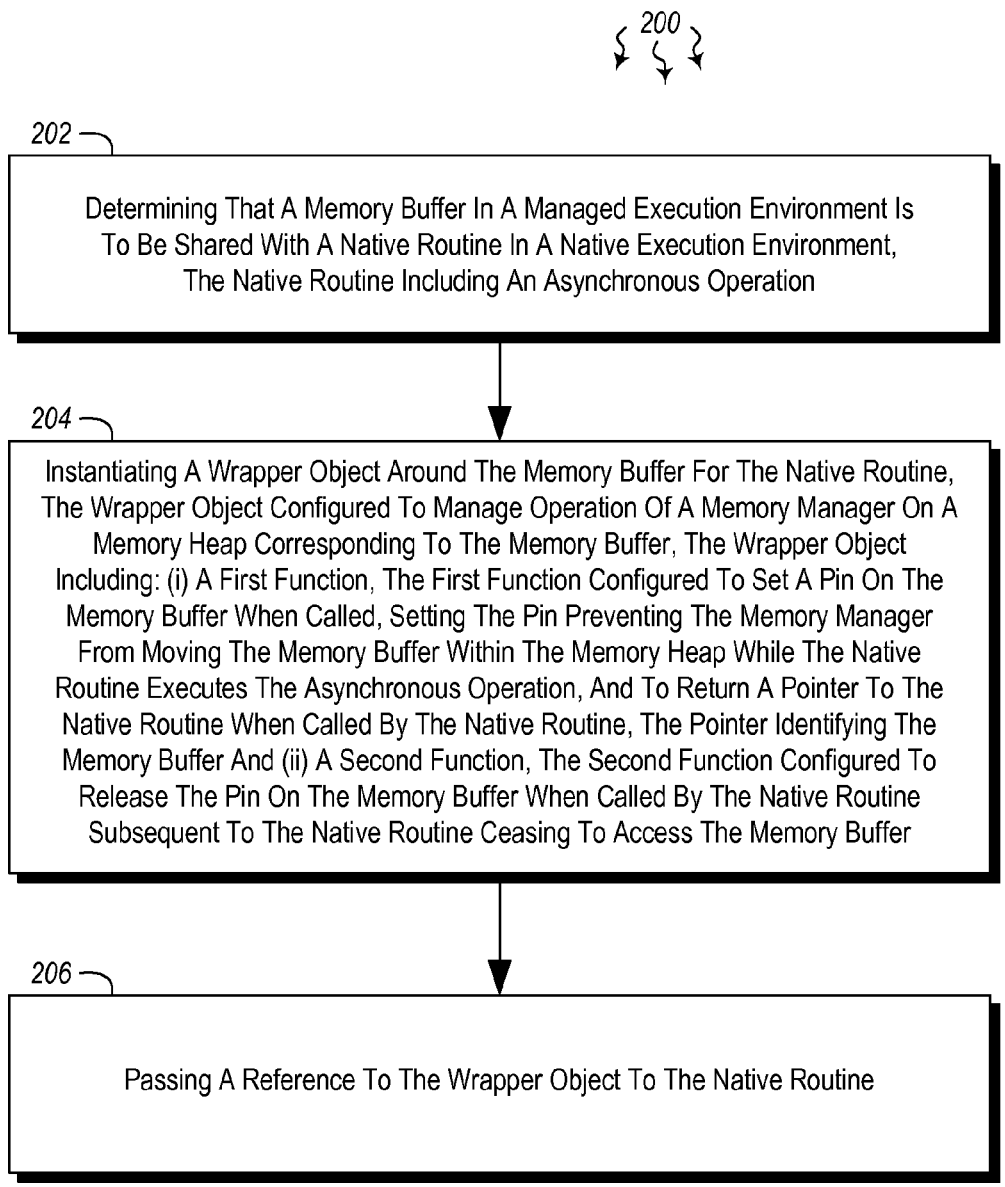
FIG. 2 illustrates a flow chart of an example method for providing a wrapper object for pinning managed memory.

FIG. 2 illustrates a flow chart of an example method 200 for providing a wrapper object for pinning managed memory. Method 200 will be described with respect to the components and data of computer architecture 100.

Method 200 includes an act of determining that a memory buffer in a managed execution environment is to be shared with a native routine in a native execution environment, the native routine including an asynchronous operation (act 202). For example, managed routine 106 may determine that it needs to call or otherwise use native routine 108. Managed routine 106 may determine that native routine 108 needs access to memory buffer 114a when performing one or more operations, such as asynchronous operation 110.

Method 200 also includes an act of instantiating a wrapper object around the memory buffer for the native routine, the wrapper object configured to manage operation of a memory manager on a memory heap corresponding to the memory buffer, the wrapper object including (i) a first function, the first function configured to set a pin on the memory buffer when called, setting the pin preventing the memory manager from moving the memory buffer within the memory heap while the native routine executes the asynchronous operation, and to return a pointer to the native routine when called by the native routine, the pointer identifying the memory buffer and (ii) a second function, the second function configured to release the pin on the memory buffer when called by the native routine subsequent to the native routine ceasing to access the memory buffer (act 204). For example, managed routine 106 (or any other appropriate component within managed execution environment 104) can instantiate wrapper object 116. Wrapper object 116 can encapsulate or "wrap around" memory buffer 114a.

Wrapper object 116 can include get function 116a which, when called, pins memory buffer 114a and returns a pointer to memory buffer 114a. Pinning memory buffer 114a prevents memory manager 112 (e.g., a garbage collector) from moving the contents of memory buffer 114a within heap 114. In addition, wrapper object 116 can include release function 116b which, when called, unpins memory buffer 114a, allowing memory manager 112 to automatically move the contents of memory buffer 114a within heap 114 at any time, as appropriate.

In some embodiments, wrapper object 116 may be instantiated from a particular type or class provided by managed execution environment 104. The type or class can expose get function 116a (e.g., GetPointer( )), which returns a pointer of appropriate size (e.g., byte *), when called. The pointer points to a fixed memory address in heap 114. The type or class can also expose release function 116b (e.g., Release( )) which has a void return type. Of course, the exact names and return types of these functions can vary. For example, release function 116b may return a Boolean indicating whether or not memory was successfully unpinned.

Method 200 also includes an act of passing a reference or pointer to the wrapper object to the native routine (act 206). For example, managed routine 106 can pass to native routine 108 a reference to wrapper objet 116, enabling native routine to make calls to get function 116a and release function 116b to obtain a pointer to, and subsequently release, memory buffer 114.

Figure 3:
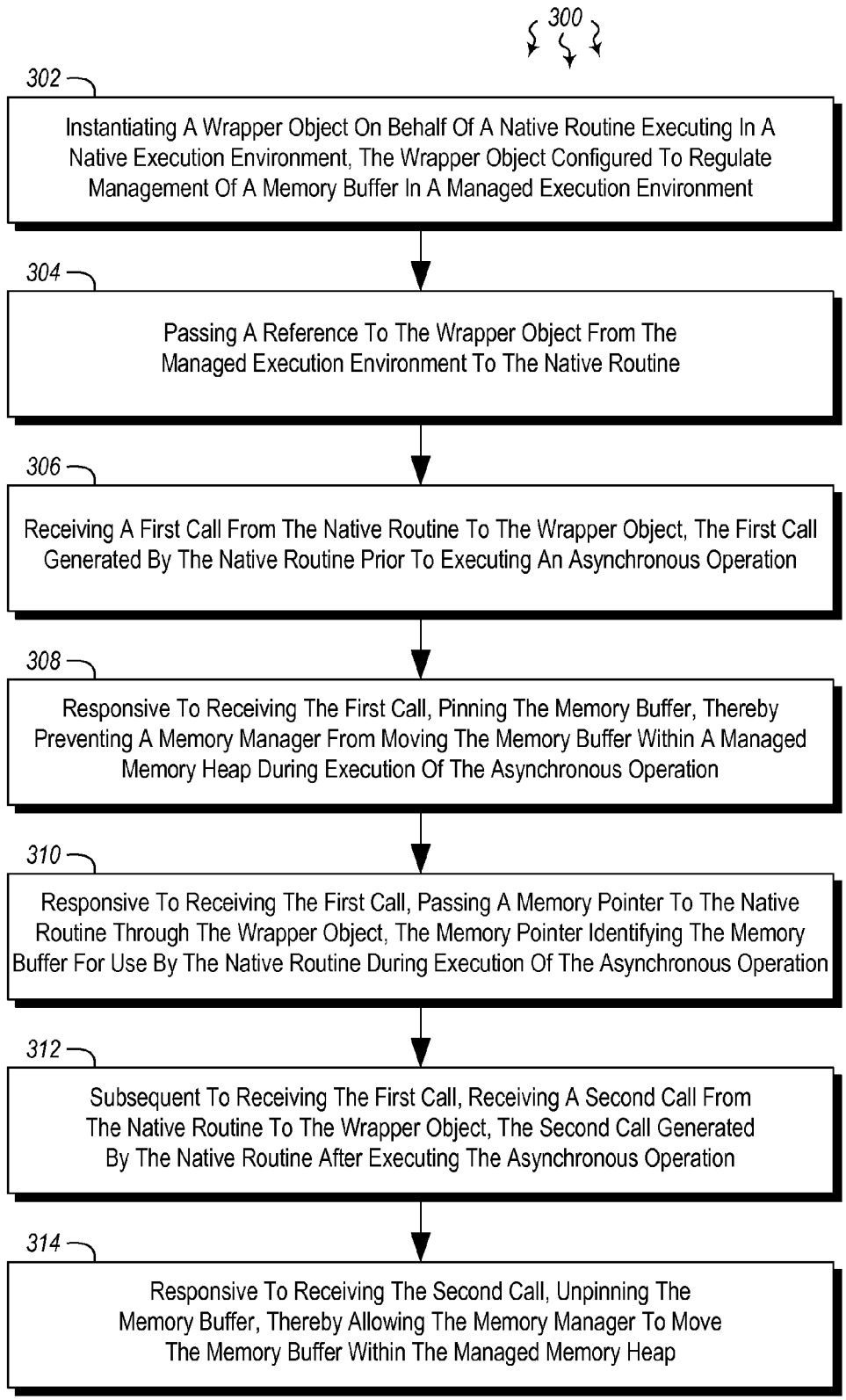
FIG. 3 illustrates a flow chart of an example method for pinning a managed memory buffer.

FIG. 3 illustrates a flow chart of an example method 300 for pinning a managed memory buffer. Method 300 will also be described with respect to the components and data of computer architecture 100.

Method 300 includes an act of instantiating a wrapper object on behalf of a native routine executing in a native execution environment, the wrapper object configured to regulate management of a memory buffer in a managed execution environment (act 302). For example, managed routine 106 can instantiate wrapper object 116 on behalf of native routine 108 executing in native execution environment 102. Wrapper object 116 can encapsulate and manage pinning of memory buffer 114a so that native routine 108 can access a fixed memory address for memory buffer 114a when appropriate.

Method 300 also includes an act of passing a reference to the wrapper object from the managed execution environment to the native routine (act 304). For example, after instantiating wrapper object 116, managed routine 106 can pass a reference to wrapper object 116 to native routine 108.

Method 300 also includes an act of receiving a first call from the native routine to the wrapper object, the first call generated by the native routine prior to executing an asynchronous operation (act 306). For example, wrapper object 116 can receive get pointer request 118 at get function 116a.

Native routine 108 can determine that asynchronous operation 110 is to access the contents of memory buffer 114a. In response, native routine 108 can send get pointer request 118 to wrapper object 116. Native routine 108 can send get pointer request 118 as late as possible. For example, native routine 108 can send get pointer request 118 prior to executing the portion of asynchronous operation 110 that accesses memory buffer 114a. As such, native routine 108 can pin memory buffer 114a more efficiently.

Method 300 also includes, responsive to receiving the first call, an act of pinning the memory buffer, thereby preventing a memory manager from moving the memory buffer within a managed memory heap during execution of the asynchronous operation (act 308). For example, wrapper object 116 can toggle a flag, increment a counter, update a table, create a pin handle, modify a portion of memory buffer 114a, send a message to memory manager 112, or take any other appropriate activities to pin memory buffer 114a. When pinned, memory manager 112 does not move the contents of memory buffer 114a within heap 114.

Method 300 also includes, responsive to receiving the first call, an act of passing a memory pointer to the native routine through the wrapper object, the memory pointer identifying the memory buffer for use by the native routine during execution of the asynchronous operation (act 310). For example, wrapper object 116 can send pointer 120 to native routine 108. Pointer 120 can comprise a memory address where memory buffer 114a resides, and can enable an operation, such as asynchronous operation 110, to access (e.g., read from or write to) the contents of memory buffer 114a.

Method 300 also includes, subsequent to receiving the first call, an act of receiving a second call from the native routine to the wrapper object, the second call generated by the native routine after executing the asynchronous operation (act 312). For example, wrapper object 116 can receive release pointer request 122 at release function 116b. Native routine 108 can determine that asynchronous operation has completed accessing the contents of memory buffer 114a. In response, native routine 108 can send release pointer request 122 to wrapper object 116. Native routine 108 can send release pointer request 122 as early as possible. For example, native routine 108 can send release request 122 subsequent to executing the portion of asynchronous operation 110 that accesses memory buffer 114a. As such, native routine 108 can unpin memory buffer 114a more efficiently.

In some circumstances, other get and/or release requests may have been received prior to release pointer request 122, such as get and/or release requests sent in connection with additional operations at native routine 108. As such, release pointer request 122 may a release request associated with the last operation to complete.

Method 300 also includes, responsive to receiving the second call, an act of unpinning the memory buffer, thereby allowing the memory manager to move the memory buffer within the managed memory heap (act 314). For example, wrapper object may toggle a flag, decrement a counter, update a table, free a pin handle, modify a portion of memory buffer 114a, send a message to memory manager 112, or take any other appropriate action to unpin memory buffer 114a. Unpinning memory buffer 114a allows memory manager 112 to move the contents of memory buffer 114a within heap 114 in accordance with operation of memory manager 112.

Accordingly, embodiments of the present invention enable a managed routine to call a native routine and to provide the native routine with a pointer to managed memory. Embodiments provide a framework which reduces (and preferably minimizes) the amount of time that the native routine pins managed memory, such as during execution of one or more asynchronous operations by the native routine. Reducing the amount of time managed memory is pinned reduces the effect that pinning has on memory management tasks of a memory manager.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a managed execution environment, a method for pinning a managed memory buffer, the method comprising:
 an act of instantiating a wrapper object on behalf of a native routine executing in a native execution environment, the wrapper object configured to regulate management of a memory buffer in a managed execution environment;
 an act of passing a reference to the wrapper object from the managed execution environment to the native routine;
 an act of receiving a first call from the native routine to the wrapper object, the first call generated by the native routine prior to executing an asynchronous operation;
 responsive to receiving the first call:
  an act of pinning the memory buffer, thereby preventing a memory manager from moving the memory buffer within a managed memory heap during execution of the asynchronous operation; and
  an act of passing a memory pointer to the native routine through the wrapper object, the memory pointer identifying the memory buffer for use by the native routine during execution of the asynchronous operation;
 subsequent to receiving the first call, an act of receiving a second call from the native routine to the wrapper object, the second call generated by the native routine after executing the asynchronous operation; and
 responsive to receiving the second call, an act of unpinning the memory buffer, thereby allowing the memory manager to move the memory buffer within the managed memory heap.

2. The method as recited in claim 1, wherein the act of instantiating a wrapper object on behalf of a native routine comprises instantiating a plurality of wrapper objects on behalf of the native routine, each wrapper object configured to regulate management of a different memory buffer.

3. The method as recited in claim 1, wherein the act of receiving the first call from the native routine to the wrapper object comprises receiving the first call at a first function that returns a pointer to a fixed memory address.

4. The method as recited in claim 1, wherein the act of receiving the second call from the native routine to the wrapper object comprises receiving the second call at a second function that has a void return value.

5. The method as recited in claim 1, wherein the act of pinning the memory buffer prevents the memory manager from including the memory buffer in a compaction or defragmentation operation.

6. The method as recited in claim 1, further comprising an act of receiving a first additional call prior to receiving the second call, the first additional call requesting to pin the memory buffer, and incrementing a counter associated with pinning the memory buffer.

7. The method as recited in claim 6, further comprising an act of receiving a second additional call prior to receiving the second call, the second additional call requesting to release the memory buffer, and decrementing a counter associated with pinning the memory buffer.

8. The method as recited in claim 1, wherein the native routine performs one or more operations to set up environment for executing the asynchronous operation prior to sending the first call to the wrapper object.

9. The method as recited in claim 1, wherein the native routine performs one or more clean up operations subsequent to sending the second call to the wrapper object.

10. The method as recited in claim 1, wherein passing a memory pointer to the native routine comprises passing a memory address to the native routine.

11. At a computer system including one or more processors and system memory, the computer system also including a managed execution environment, a method for providing a wrapper object for pinning managed memory, the method comprising:
 an act of determining that a memory buffer in a managed execution environment is to be shared with a native routine in a native execution environment, the native routine including an asynchronous operation;
 an act of instantiating a wrapper object around the memory buffer for the native routine, the wrapper object configured to manage operation of a memory manager on a memory heap corresponding to the memory buffer, the wrapper object including:
  a first function, the first function configured to:
   set a pin on the memory buffer when called, setting the pin preventing the memory manager from moving the memory buffer within the memory heap while the native routine executes the asynchronous operation, and
   return a pointer to the native routine when called by the native routine, the pointer identifying the memory buffer; and
  a second function, the second function configured to release the pin on the memory buffer when called by the native routine subsequent to the native routine ceasing to access the memory buffer; and
 an act of passing a reference to the wrapper object to the native routine.

12. The method as recited in claim 11, wherein the act of determining that the memory buffer in the managed execution environment is to be shared with the native routine comprises determining that a managed routine is to call the native routine.

13. The method as recited in claim 11, wherein the native routine is an operating system-level routine that performs one or more asynchronous input and/or output tasks.

14. The method as recited in claim 11, wherein the first function and the second function are exposed to the native routine as part of a class or type.

15. The method as recited in claim 11, wherein the wrapper object is configured to receive a plurality of calls at each of the first function and the second function.

16. The method as recited in claim 11, wherein the native routine calls the first function prior to executing the asynchronous operation.

17. The method as recited in claim 11, wherein the native routine calls the second function subsequent to executing the asynchronous operation.

18. The method as recited in claim 11, wherein setting the pin on the memory buffer comprises incrementing or decrementing a counter.

19. The method as recited in claim 11, wherein setting the pin on the memory buffer comprises toggling a flag.

20. A computer system, comprising:
one or more processors; and
one or more computer storage devices having stored thereon computer executable instructions which when executed by the one or more processors perform the following:
establish a managed execution environment, the managed execution environment including a memory manager and a memory heap;
execute a managed routine within the managed execution environment;
based at least in part on executing the managed routine, provide a wrapper object within the managed execution environment, the wrapper object configured to regulate management of a memory buffer within the memory heap on behalf of a native routine in a native execution environment;
at the wrapper object, process a first call from the native routine, the first call generated by the native routine prior to executing an asynchronous operation, and in response:
pin the memory buffer, thereby preventing the memory manager from moving contents of the memory buffer within the heap during execution of the asynchronous operation; and
pass a memory pointer to the native routine, the memory pointer identifying a memory address of the memory buffer within the memory heap for use during execution of the asynchronous operation;
at the wrapper object, process a subsequent call from the native routine, the subsequent call generated by the native routine after executing the asynchronous operation, an in response unpin the memory buffer, thereby allowing the memory manager to move contents of the memory buffer within the memory heap.

* * * * *